United States Patent

Leder

[15] 3,637,345
[45] Jan. 25, 1972

[54] PROCESS FOR REMOVING ACID GASES FROM GASCOUS METHOD

[72] Inventor: Frederic Leder, Elizabeth, N.J.
[73] Assignee: Esso Research and Engineering Company
[22] Filed: May 16, 1969
[21] Appl. No.: 825,444

[52] U.S. Cl. ................................................23/2 R
[51] Int. Cl. ............................B01d 53/16, B01d 53/34
[58] Field of Search ........................23/2, 2.3, 3, 3.3

[56] References Cited

UNITED STATES PATENTS

| | | | |
|---|---|---|---|
| 1,882,289 | 10/1932 | Lush | 23/2 A |
| 1,951,992 | 3/1934 | Perkins | 23/2 A |
| 2,161,663 | 6/1939 | Baehr et al. | 23/3 LA |
| 2,718,454 | 9/1955 | Wylie | 23/3 X |

Primary Examiner—Earl C. Thomas
Attorney—Chasan and Sinnock and Michael Conner

[57] ABSTRACT

When using potash or other alkali metal salts such as carbonates, hydroxides, hydrosulfides, sulfides, or bicarbonates to absorb acid gases such as $H_2S$ and $CO_2$ from gaseous mixtures, unexpectedly high absorption rates are obtained by adding amines which when present in critical amounts exhibit regions of liquid-liquid-gas immiscibility in the separation system.

12 Claims, No Drawings

PROCESS FOR REMOVING ACID GASES FROM GASCOUS METHOD

PRIOR ART

The use of potash or other alkali metal salts to absorb acid gases such as $CO_2$ and $H_2S$ is well known. In U.S. Pat. No. 2,718,454 Patentee makes use of potash and similar alkali metal salts in conjunction with amines such as monoethanol amine, diethanolamine and triethanolamine to remove acid gases from a solution. The combination of the alkali metal compounds in conjunction with the amine yields higher capacity for acid gases than systems with the amine alone.

In British Pat. No. 1,063,517 to Allen G. Eickmeyer the problem of removing acid bodies such as $CO_2$ and $H_2S$ is again faced. Patentee teaches the use of potassium carbonate and other alkali metal carbonates in conjunction with particular amines which will avoid corrosion problems and at the same time greatly accelerate the absorption and subsequent desorption of the $CO_2$ and $H_2S$. Specifically, patentee makes use of ethylene polyamines, alkanolamines or alkanolamine borates as well as mixtures thereof. Examples of such amines are ethylene diamine, diethylene triamine, diethanolamine, ethylenediamine, etc.

All of these techniques represent a method by which some of the acid gas may be removed; they have, however, shown a limited rate and capacity for acid body removal, relative to this invention.

SUMMARY OF THE INVENTION

According to this invention it has unexpectedly been discovered that the use of particular amines such as piperidine, 1,6-hexane diamine, their derivatives and other organic amines whose carbon to nitrogen ratios vary between 1:1 and 6:1, when added to solutions of alkali metal salts, in critical amounts, tend to cause areas of phase separation. When acid gas containing gaseous mixtures are contacted with these two phase systems, the removal of the acid gas is several times greater than the removal which was effected in previous alkali metal amine systems in which only one phase existed.

This phase separation takes the form of a lower-critical-solution-temperature type of behavior. Solubility limits depend on solid concentration, $CO_2$ content of the mixture and temperature. The incipient phase separation or actual occurrence of two liquid phases tends to destabilize the liquid interface causing local variations in concentration and surface tension and rapid surface removal thereby facilitating mass transfer.

The contacting of the absorbent mixture and the acid gas may take place in any suitable contacting tower. Acid gas includes sulfur dioxide, carbon dioxide, and oxides and sulfur derivatives of $C_1$ through $C_4$ hydrocarbons. These acid gases may be present in trace amounts within a gaseous mixture or in major proportions.

The absorbing solution will comprise a major proportion of alkali metal compounds and a minor proportion of the amine. The amount of amine necessary to form two phases will vary with conditions such as temperature, alkali metal salt content, acid gas content and the particular amine. For piperidine and its derivatives and 1,6-hexane diamine and its derivatives, at a temperature of 50° to 150° C. and a salt content of 5 to 25 weight percent, region of immiscibility will first form at a concentration of amine above about 4 weight percent. Preferred amine concentrations are 4 to about 20 weight percent. Acid gas content, to facilitate the formation of the separate phases should be less than 50 percent of saturation, preferably less than 30 percent.

The absorbent mixture, after absorbing the acidic bodies is then subjected to regeneration. In the regeneration unit, the liquid is close to saturation with acid gas and is therefore one phase. Stripping of acid gas may therefore be accomplished conventionally by blowing with steam or inert gas according to techniques well known in the art.

More specifically, the instant invention pertains to a method for removal of acid gases from gaseous mixtures in which they are carried. By acid gases it is meant $CO_2$, $H_2S$, oxidation products and sulfides of methane, ethane, propane, and butane. Such acid gases in the fluid or gaseous state are found in mixtures of natural gas, hydrogen, and hydrogen and nitrogen. The removal of these acid gases is essential since some of them are inherently corrosive, some tend to precipitate in processing, some are pollutants and some catalytic poisons. To remove these acid gases from the mixture, the mixture, while in a fluid, preferably gaseous state, must be brought into contact with a suitable absorbent which will preferentially absorb the acid gases and at the same time substantially exclude other elements of the mixture. It has been known in the past to use alkali metal carbonates, bicarbonates, hydroxides, hydrosulfides, and sulfides for the absorption of the acidic bodies from a fluid or gaseous mixture. Typical compounds which have been utilized include sodium hydroxide, sodium hydrosulfide, sodium sulfide, sodium bicarbonate, sodium carbonate, lithium hydroxide, lithium hydrosulfide, lithium sulfide, lithium bicarbonate, lithium carbonate, potassium hydroxide, potassium hydrosulfide, potassium bicarbonate and potassium carbonate.

The preferred alkali metal salts are potassium carbonate and sodium carbonate. The alkali metal salts, i.e., carbonates are present in an amount of about 5 to 25 weight percent of the solution. It should be noted that the solution is preferably aqueous. A preferred amount of alkali metal salt would be from 10 to 20 percent by weight and most preferred range of salt is approximately 15 to 20 weight percent.

The absorptive ability of the alkali metal compound is greatly increased by adding amines which have the capacity to form, under specified conditions, an immiscible region within the alkali metal solution. Absorption rates are increased from two to five times above those found when one utilizes the previously mentioned techniques for the removal of acid gases.

The amine which is to be utilized in the instant invention should have a carbon-to-nitrogen ratio between 1:1 and 6:1 and when added in critical proportions under appropriate conditions will form the necessary regions of immiscibility. To accomplish this, an amine concentration of above about 4 weight percent should be utilized. Preferable range of amine present within the aqueous solution is about 5 to 20 weight percent and most preferably 8 to 12 weight percent. These ratios will, of course, be applicable to the typical absorption temperatures which are in the region of about 50° to 150° C. For different temperatures, different ratios will have to be calculated. Additionally, salt content will be between about 5 to 25 weight percent of the aqueous solution. The acid gas content of the solution, to maintain two phases, should be less than about 50 percent of saturation, preferably less than about 30 percent of saturation. Should the acid gas concentration increase to substantially more than 50 percent of saturation the two phases will disappear.

Preferred amines to be used under the conditions outlined above are piperidine and its derivatives. By derivatives it is meant the following:

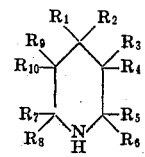

wherein $R_1$ to $R_{10}$ are selected from the group consisting of hydrogen, $C_1$ to $C_3$ alcohols, $C_1$ to $C_3$ alkyl groups, $C_2$ to $C_3$ alkenyl groups, amino groups, carboxyl groups, hydroxyl groups, sulfides, hydrosulfides, and phosphate groups. It is preferred that hydrogen and $C_1$ to $C_3$ alkyl or alkenyl groups are utilized. Most preferred is that the various R's are methane and hydrogen in which case piperidine itself is utilized.

Another preferred amine is 1,6-hexane diamine and derivatives thereof. By derivatives of 1,6-hexane diamine it is meant the following:

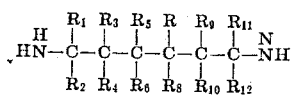

wherein $R_1$ to $R_{12}$ are selected from the group consisting of hydrogen, $C_1$ to $C_3$ alcohols, $C_1$ to $C_3$ alkyl groups, $C_2$ to $C_3$ alkenyl groups, amino groups, carboxyl groups, hydroxyl groups, sulfides, hydrosulfides and phosphate groups. Total substituted groups should have a ratio of polar/nonpolar groups between 1:1 and 1:6. Other amines which may be utilized are those having carbon to nitrogen ratios between 1:1 and 1:6, preferably between 1:1 and 1:3.

The contacting between the acid gas containing fluid mixture and the absorptive aqueous solution may be cocurrent or countercurrent; countercurrent is preferred. Temperature during the contacting may vary between 50° and 150° C., preferably 90° to 120° C. and most preferably 100° to 110° C. Pressures may vary widely, between 0 p.s.i.g. and 1,000 p.s.i.g., preferably 100 and 500 p.s.i.g., and most preferably 300 and 400 p.s.i.g. Generally, the countercurrent contacting to remove the acid gas will last for a period of from 1 to 60 minutes. The contacting may take place when the acid gas containing mixture is either in the liquid or gaseous state but the gaseous state is much preferred. The contacting zone may be a packed tower, sieve trays or any convenient gas scrubber. A standard stainless steel contacting tower is particularly effective. The tower may be equipped with bubble trays, Raschig rings or any other well-known packing material to facilitate contacting. The gaseous mixture which is recovered with substantially all of the acidic gases removed may be used for many purposes, i.e., ammonia synthesis, hydrotreating or liquefied natural gas production. Absorbing solution, which is saturated with acidic gases such as $CO_2$ and $H_2S$ must then be regenerated so that it may be used again. It is regenerated by conventional means; typically, steam is passed through the liquid and acid gases are stripped out. The absorbing solution after being cleansed of the acidic bodies, may be recycled back to the contacting tower. Makeup adsorbent may be added as needed. Alternative methods for regenerating the contaminated adsorbent include air or $N_2$ stripping.

SPECIFIC EMBODIMENTS

EXAMPLE 1

In these examples, runs were made comparing various additives in a potassium carbonate aqueous solution. Four different amines were compared, at different concentrations. Piperidine, ethylaminoethanol, diethanolamine borate, and 1,6-hexane diamine were the compounds. All of these compounds were used to remove $CO_2$ from a pure gas phase. The $CO_2$ was contacted countercurrently in the gaseous phase with the various absorbent solutions. The contacting took place in a stirred vessel of 9-inch diameter which contained about 4 liters of absorbent solution. As indicated in the table the weight of the various amines was varied from 0 to 18 weight percent. Contacting took place at a temperature of 80° C. and a pressure of 780 mm. for a period of up to about 3 hours.

TABLE

| | Initial Absorption Rates | | | |
|---|---|---|---|---|
| Wt. % | Rate (moles/hr.)* Piperidine | EAE | Diethanolamine Borate | 1-6HDA |
| 0 | 0.70 | 0.70 | 0.70 | — |
| 2.5 | 1.70 | 1.60 | 1.00 | — |
| 5 | 2.70 | 1.70 | 1.20 | 1.80 |
| 10 | 3 | 2.20 | 1.40 | 2.5 |
| 12 | 4.2 | 2.50 | 1.45 | — |
| 18 | 5.0 | 3.00 | — | — |

*Measured across a 410 cm.² interface 80° C. 150 r.p.m. in 3,800 cc. of 20% Potash buffer in which the $HCO_3/CO_3$ ratio is 1:1

Above about 5 weight percent the piperidine, 1,6-hexamethylenediamine formed two phases. As the $CO_2$ concentration increased the second phase tended to disappear.

Below 5 percent amine all the various solutions were totally miscible. Above about 5 weight percent piperidine and 1,6-hexamethylenediamine the partial miscibility effect was observed and the absorption rates were significantly higher as may be seen from the table. At this point the piperidine absorption rate was 2.70 moles per hour as compared to 1.20 for the diethanolamine borate. This is a significant difference; at 18 percent amine the piperidine rate is some 60 percent higher than that observed with ethanolaminoethanol.

EXAMPLE 2

In this example the exact conditions of example 1 are utilized except that instead of the compounds described in example 1

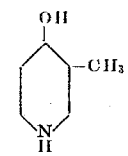

is utilized. The concentration of this compound is varied to correspond to the concentration of piperidine in example 1. Substantially identical results are achieved, i.e., at a concentration of 5 weight percent 2.2 moles per hour of $CO_2$ are absorbed.

EXAMPLE 3

In this example the exact conditions of example 1 are utilized again except that in place of the compounds described in example 1

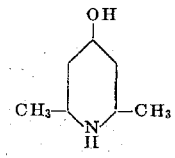

is utilized. Again results substantially identical to those achieved with piperidine in example 1 are found.

EXAMPLE 4

In this example conditions identical to example 1 are utilized except that

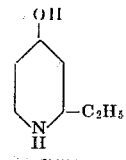

is substituted for the compounds in example 1. The results achieved are substantially identical to those achieved in example 1 when utilizing piperidine.

EXAMPLE 5

In this example the exact conditions of example 1 are utilized except that

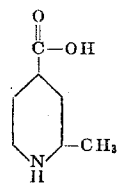

is substituted for the compounds in example 1. Here again results substantially identical to those achieved for piperidine are obtained.

EXAMPLE 6

In this example the exact conditions of example 1 are utilized except that

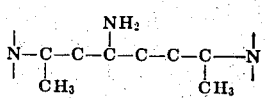

is substituted for the compounds in example 1. Results substantially identical to those achieved in example 1 with 1,6-hexane diamine are observed.

EXAMPLE 7

In this example the exact conditions of example 1 are utilized except that

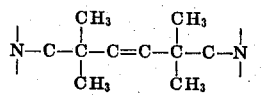

is substituted for the compounds. Results substantially identical to those achieved with 1,6-hexadiamine are observed.

What is claimed is:

1. A process for removing acid gases from a gaseous mixture, said acid gases selected from the group consisting of $CO_2$, $H_2S$, and oxidation products and sulfides of methane, ethane, propane and butane which comprises contacting said mixture with a solution, said solution comprising 5 to 25 weight percent of an alkali metal salt, said salt selected from the group consisting of alkali metal carbonates, bicarbonates, hydroxides, hydrosulfides and sulfides and at least about 4 weight percent of an amine, said amine being selected from the group consisting of amines having the general formula

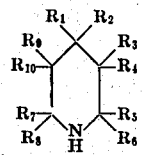

wherein $R_1$ to $R_{10}$ are independently selected from the group consisting of hydrogen, $C_1$ to $C_3$ alcohols, $C_1$ to $C_3$ alkyls, $C_2$ and $C_3$ alkenyls, aminos, carboxyl and hydroxyls and amines having the general formula

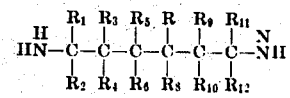

wherein $R_1$ to $R_{12}$ are independently selected from the group consisting of hydrogen, $C_1$ to $C_3$ alcohols, $C_1$ to $C_3$ alkyl groups, $C_2$ to $C_3$ alkenyl groups, amino groups, carboxyl groups, and hydroxyl groups, at a temperature of 50° to 150° C., said amines being capable of forming regions of immiscibility within said solution.

2. The process of claim 1 wherein said solution is no more than about 50 percent saturated with said acid gases.

3. The process of claim 2 wherein said acid gas is $CO_2$.

4. The process of claim 2 wherein said acid gas is $H_2S$.

5. The process of claim 1 wherein said amine is piperidine.

6. The process of claim 1 wherein said amine is 1,6-hexanediamine.

7. The process of claim 1 wherein said amine is present in the amount of 5 to 20 weight percent.

8. The process of claim 7 wherein said alkali metal salt is an alkali metal carbonate.

9. The process of claim 7 wherein said alkali metal salt is sodium carbonate.

10. The process of claim 7 wherein said mixture is natural gas.

11. The process of claim 7 wherein said amine is piperidine.

12. The process of claim 7 wherein said amine is 1,6-hexamethyldiamine.

* * * * *